June 8, 1948.  W. H. BUENTE ET AL  2,442,887
PHONOGRAPH
Filed May 25, 1943  3 Sheets-Sheet 1
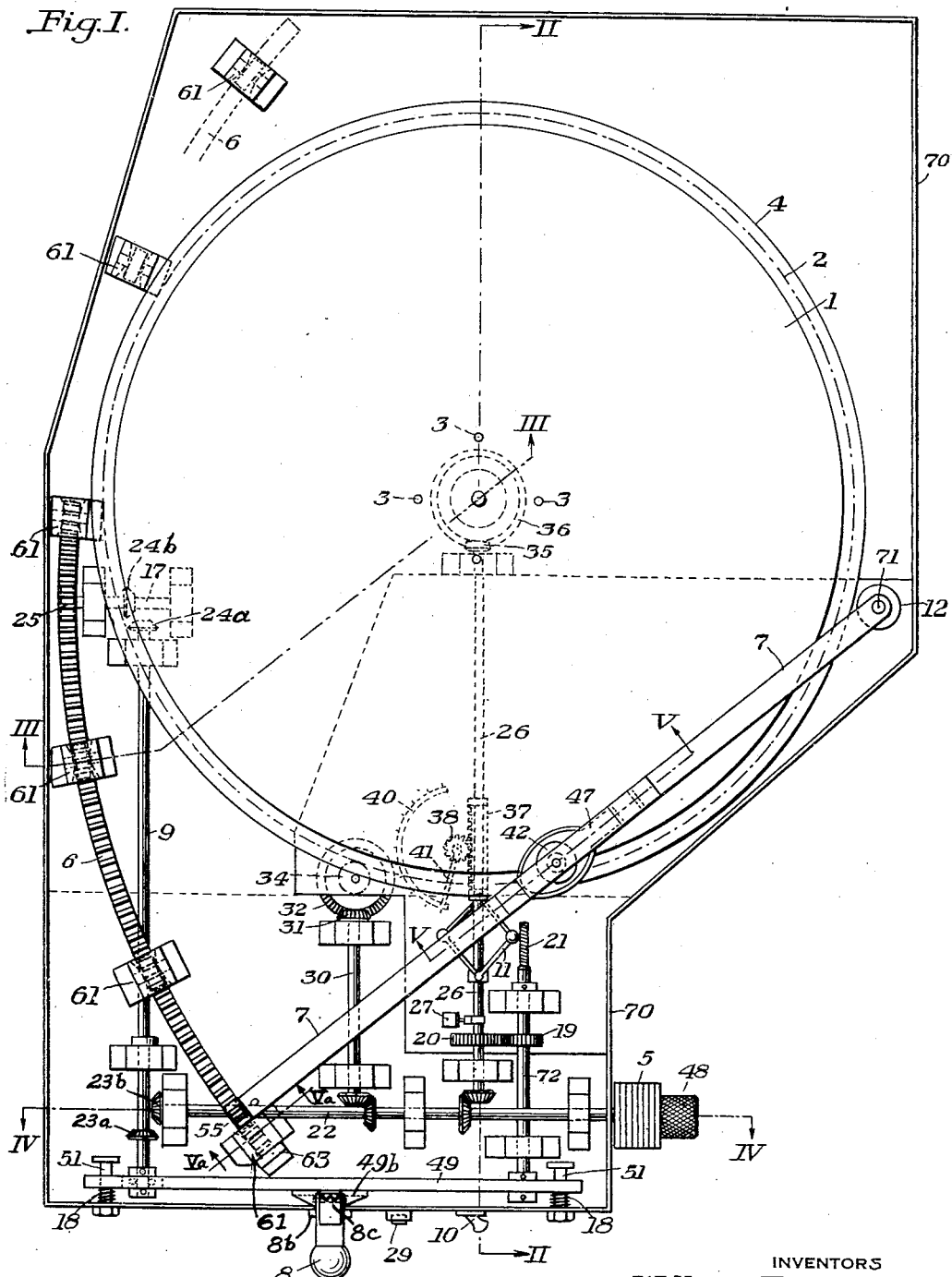
Fig.I.
INVENTORS
Willard H. Buente
Harvey L. Dunker
by Christy Parmelee and Strickland
their attorneys

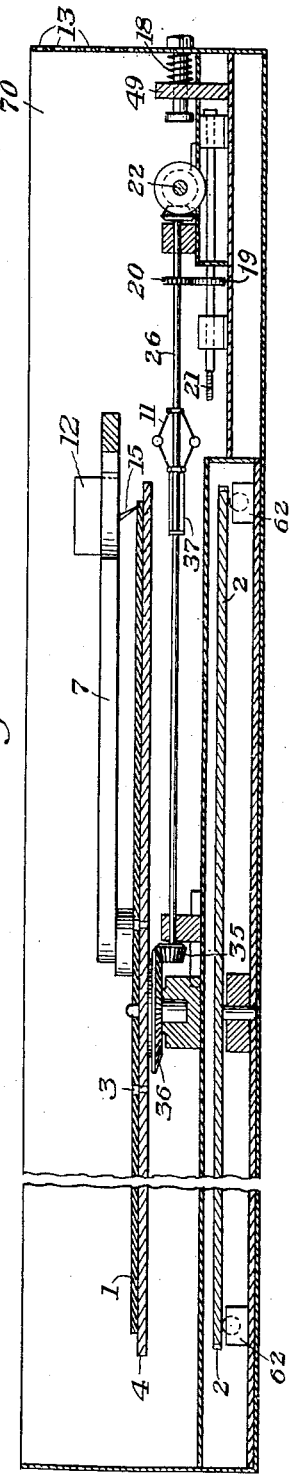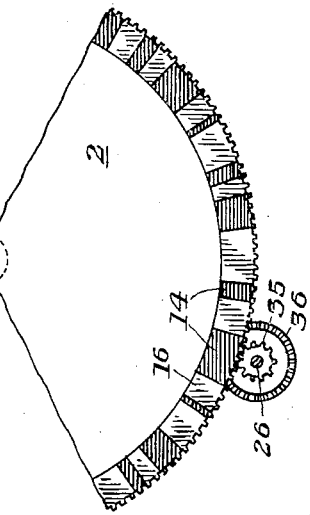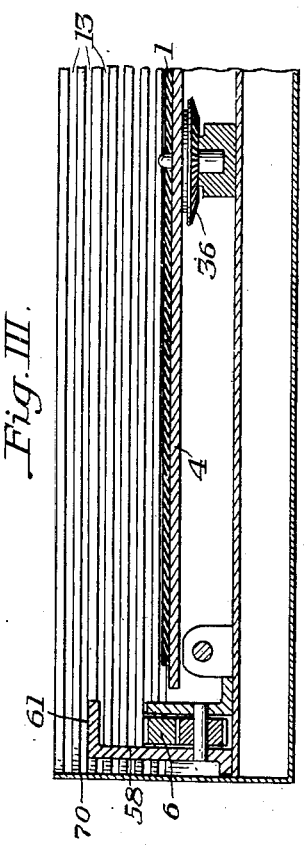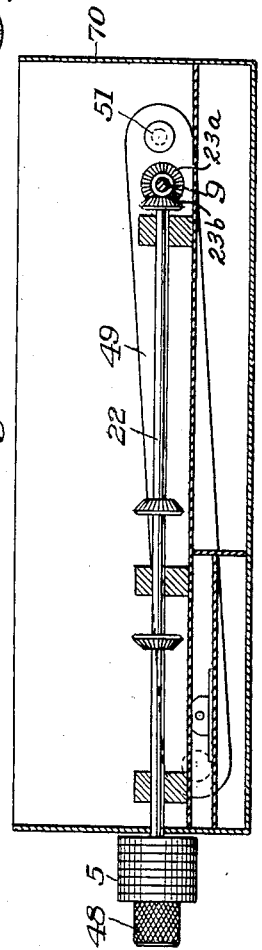

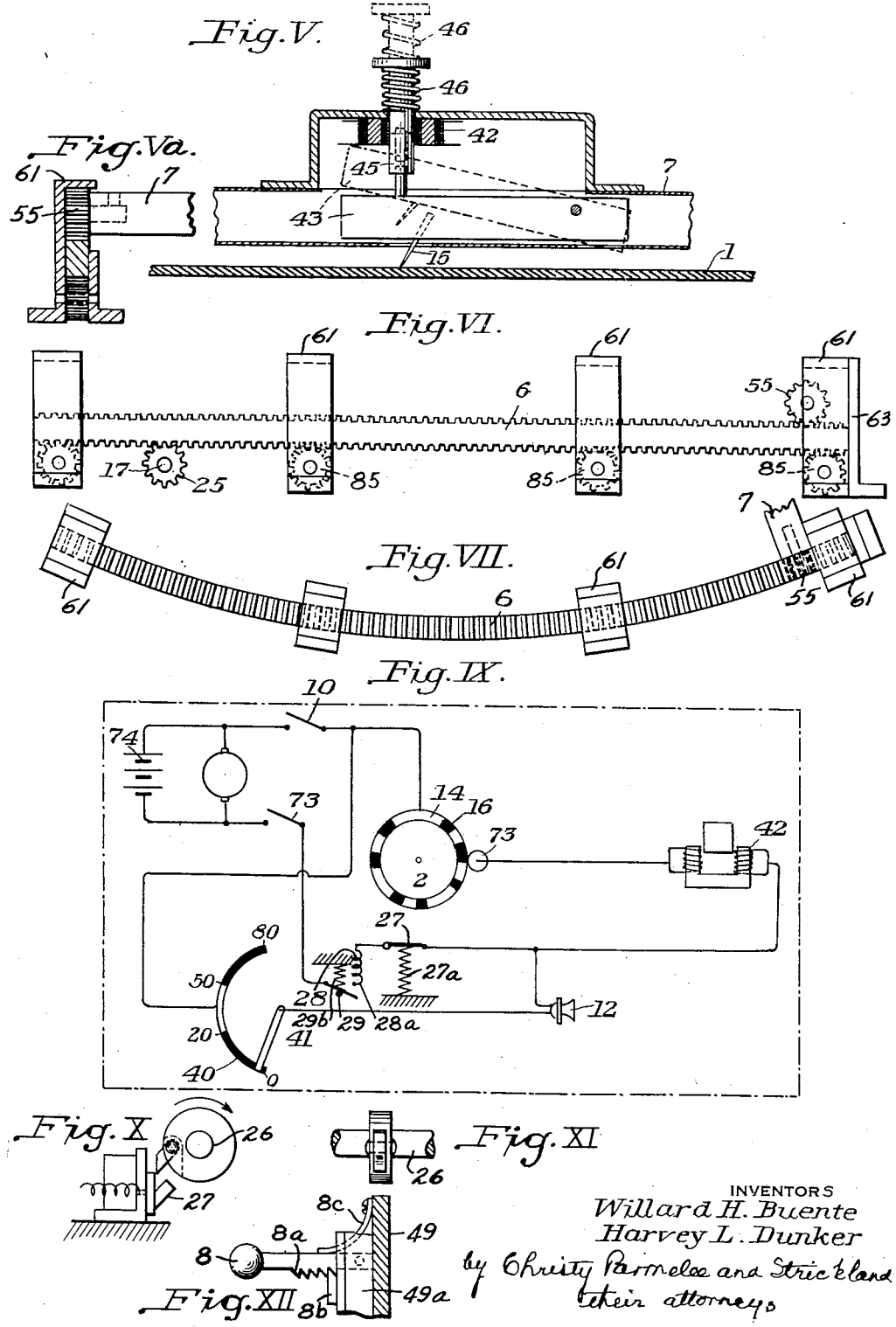

Patented June 8, 1948

2,442,887

UNITED STATES PATENT OFFICE 2,442,887

PHONOGRAPH

Willard H. Buente and Harvey L. Dunker, Pittsburgh, Pa.

Application May 25, 1943, Serial No. 488,336

8 Claims. (Cl. 274—1)

This invention relates to phonographs, and consists in an instrument applicable to and organized with a vehicle and adapted to deliver, ordinarily intermittently, in the course of a run of the vehicle, audible advice descriptive of or otherwise pertinent to the route as the vehicle traverses it. An obvious application is to a sightseeing bus, and to such application reference will be made in the course of the ensuing description.

In the accompanying drawings Fig. I is a view in plan with the top removed, showing the instrument somewhat diagrammatically. Fig. II is a view in vertical section, on the plane indicated by the line II—II, Fig. I. Fig. III is a fragmentary view, showing the apparatus in section, on the broken plane indicated at III—III, Fig. I. Fig. IV is a view in section, on the plane indicated at IV—IV, Fig. I. Fig. V is a fragmentary view in section, and to larger scale, longitudinally of the bridge-arm 7, on the plane indicated at V—V, Fig. I. Fig. Va is a view in section on the plane indicated at Va—Va in Fig. 1. Figs. VI and VII are fragmentary views, showing in elevation and in plan the gear rack 6 and the drive. Fig. VIII is a fragmentary view in plan of an element of the instrument termed the contact plate. Fig. IX is a wiring diagram. Figs. X and XI are enlarged fragmentary front and side views of reverse switch 27 shown in Figs. I and IX. Fig. XII is a fragmentary elevational view of latch 8 of Fig. I.

Referring to Figs. I and II, a circular record platform 4 will be seen, mounted for rotation within a suitable casing 70, and in suitable position (as will be understood) upon the structure of a vehicle. This platform adjacent its centre of turning is equipped with a plurality of legs 3 (here shown to be four, though the exact number is not important), by means of which a correspondingly perforated record disk 1, applied to and resting upon the platform, is caused to rotate in integral union with the platform. It may be understood that, but for the perforations, the record disk 1 is of conventional form, and bears on one or both faces the usual spiral groove to be engaged by the needle of the sound-reproducing device of the phonograph.

A needle bridge-arm 7, pivoted at 71, beyond but adjacent the periphery of the platform 4, rests at its distal end upon an arc-shaped gear-rack 6, which is centered at 71 and which is movable longitudinally in keepers 61. Support gears 85 are provided in the keepers 61 which mesh with the bottom of rack 6. The bridge-arm 7 at its distal end carries a pinion 55 that meshes with teeth formed on the upper face of the gear-rack 6. The pinion turns idly, to allow the end of the bridge-arm 7 to advance (clockwise, Fig. I), upon gear-rack 6. A stop 63 limits the retrograde (counter-clockwise, Fig. I) movement of the arc-shaped gear rack 6. A glance at Fig. I will show an arrangement of these parts, such that the gear-rack may advance in its arcuate path that lies beyond the periphery of platform 4, and on the side opposite to that of the pivoting of the bridge-arm. The bridge-arm 7, designed for rigidity and lightness, may be formed of sheet steel, shaped to box form in cross-section. Manifestly its support at the distal end is a further feature making for rigidity and accuracy of position in the operating assembly.

Pivoted for vertical swing in the bridge-arm 7 is the needle carrier 43 (of Fig. V), equipped with a needle 15. The carrier 43 is normally held in its elevated position (the dotted-line position, Fig. V) with the needle raised from the record disk, by a spring 46. A solenoid 42, whose armature 45 engages the carrier 43 is effective when energized to shift the carrier, against spring tension, from the dotted-line position (Fig. V) to the full-line position by virtue of a centrally located magnetic piece in the otherwise nonmagnetic armature 45, such structure being well-known in the electromagnet art, and so to bring the needle 15 to engagement with the record disk 1. When the solenoid is de-energized the needle resumes inactive position. As in the familiar phonograph, the rotation of the disk, with its sound groove engaged by the needle, effects the gradual swing of the bridge-arm 7 in clockwise direction (Fig. I). The sound generated by the vibration of the needle as it follows the sound groove in the record disk 1 is delivered through an amplifier 12. The casing 70 is provided with a grill opening 13, to afford freer emergence of sound.

The record-carrying platform 4 is rotated by means of a rotating shaft 26, through the bevel-gears 35, 36 shown in Figs. I and II; and shaft 26 in turn is driven, through the gear transmission 19, 20, by the rotating shaft 72, which is a rigid continuation of a flexible shaft 21. Through this flexible shaft 21 the rotating members that have been designated are driven from the transmission apparatus of the vehicle, with the effect that the record-bearing platform 4 rotates as the vehicle travels, and at a rate of rotation that accords with the speed of the vehicle.

While the record rotates so long as the vehicle advances, provision is made that the phonograph may speak at intervals in the progress of the advance, but not ordinarily continuously. It is to such end that the needle 15 is organized, in the manner described, to swing between active and inactive positions, and the means for effecting the ordered swing of the needle are now to be described.

Rotatably mounted in the casing 70, and conveniently in concentric position beneath the platform 4 is a master disk 2. It is supported upon bearings 62. It is engaged peripherally by a brush 73 (cf. the wiring diagram, Fig. IX). The disk 2 is formed of conducting material but the continuity of current-transmitting contact of the brush with the rotating disk is interrupted by the formation of the periphery of the disk with alternate segment-shaped blocks 14 and 16 of conducting and of insulating material. The disk 2 is rotated in simultaneity with platform 4 by a shaft 30 which, through the counter-shaft 22 and the gear transmission shown in Fig. I, is connected with the platform-driving shaft 26, and which through the gear connection 31, 32, 34 drives the disk 2. Comparing Figs. I and V with the wiring diagram, Fig. IX (and with reservation concerning parts yet to be described), it will be seen that, as the vehicle travels and the platform 4 and the disk 2 turn, the solenoid 42 will be intermittently energized, and the phonograph will alternately speak and be silent.

Thus it appears that disk 2 is a master disk, and of course, is carefully prepared, with its alternate peripheral blocks of conducting and non-conducting material severally of predetermined extent. In an instrument built for service, the disk 2 may be 16 inches in diameter, and the driving gear may be so proportioned that for every mile of travel of the vehicle the disk 2 will turn through an interval at its periphery of three-thirty-seconds of an inch (=40' in angular turning); and a complete rotation of disk 2 will be effected by vehicle travel of 536 miles. Suppose a sight-seeing bus, traveling over a route of approximately 500 miles or less, to be equipped with an instrument of the invention. It is desired that the phonograph shall speak at intervals, describing objects of interest as in the course of the run they are reached, but shall at other times remain silent.

Record disk 1 is first prepared, by recording the speech of one who makes explanation at proper intervals while traversing in a proper vehicle the route determined upon; and, in the progress of the making of the record, the readings of the odometer will be noted at the beginning and at the end of each portion of the speech. The master disk 2 is then prepared in the shop, with the aid of instruments of precision. The extent of the successive portions 14 and 16 of conducting and of non-conducting material will be precisely determined, according to the odometer readings last mentioned. When the two disks 1 and 2 have been prepared they are checked in the shop and their synchronization ensured. Then as many duplicates as may be desired may be produced from them.

It has been found in actual performances that, within the range of ordinary travel of such a vehicle as a sight-seeing bus (20 to 50 miles per hour—the actual figures will depend on the speed ratio adopted), the instrument here described will deliver a readily intelligible utterance; but that, at speeds beyond the range indicated, the utterance will not be intelligible. It is desirable, therefore, that the amplifier 12 be active within, but only within, such range of speed. Upon the shaft 26 a sleeve 37 is mounted to slide freely. This sleeve is carried by a weighted toggle structure 11 of familiar sort, which, secured at its lower end (Fig. I) to the shaft 26 and rotating with the shaft, spreads laterally and contracts longitudinally of the shaft as speed increases and elongates again (as under the influence of a spring, not shown) as speed diminishes. Thus, the position of the sleeve 37 upon shaft 26 is an expression of the speed of travel of the vehicle. The sleeve is provided externally with circumferentially extending teeth and becomes a rack, that is engaged by a pinion 38, and pinion 38 carries an arm 41 which throughout its range of swing makes contact with an arc-shaped plate 40. The arm 41 is of conducting material and the plate 40 is in part only of conducting material, and the cooperating parts 40 and 41 become a make-and-break device, through which a circuit is closed when, and only when, and only so long as, the vehicle is traveling at a speed of 20-50 miles an hour. Referring again to the diagram, Fig. IX, it will be perceived that the circuit which energizes the solenoid 42 and brings the needle 15 to operative engagement with the record disk 1 and which energizes also the amplifier 12 is completed when the contact of arm 41 with plate 40 lies between the points marked 20 and 50. Then only is the phonograph effective.

The shaft 26 carries an emergency reverse switch 27 held normally closed by a tension spring 27a (Figs. I, IX, X and XI) whose operating member is in the well-known form of a lever pivotally mounted in a peripheral pocket on shaft 26 so as to be centrifugally operated only in one direction and which, when the vehicle moves backward, immediately breaks the circuit and interrupts phonograph operation. When this has happened and the vehicle is to travel forward again, the circuit will not automatically be restored; but, when the predetermined route is resumed, a push button 29 must be pushed in order to overcome the compression of compression spring 29b which normally tends to keep the switch of relay 28 open and thereby complete a circuit through the holding coil 28a of relay 28 which energized will effect closing again of the circuit through the switch 27, bearing in mind the fact that switch 27 has previously closed by virtue of the tension of tension spring 27a that normally keeps the switch in a closed position.

The transmission shaft 72 is journaled in a bar 49, which is movable upon guide pins 51 within casing 70. It is held in the position shown in Fig. I by a latch 8 shown in detail in Fig. XII that has ratchet teeth that may be selectively engaged with the casing 70. Latch 8 has a knob portion pivotally mounted on bracket 49b which, in turn, is integrally secured to bar 49. Leaf spring 8c, also secured to bar 49, urges the knob downwardly so that its ratchet teeth 8a selectively engage a fixed pawl 8b rigidly secured to bracket 49a. Thus bar 49 may be adjustably positioned with respect to casing 70. The bar 49 is backed by springs 18 that, so long as the latch 8 is closed, are held under tension. When, however, the latch is opened the springs 18 are effective to shift the bar and with it the shaft 72. Such shifting of the shaft carries gear-wheel 19 out of engagement with gear-wheel 20 and the instrument no longer operates in response to vehicle travel. This is a practically necessary feature. It happened in the course of such an extended sight-seeing trip as has, for purposes of illustration, been supposed that there will be incidental departures of indefinite length from the previously laid-out route—detours, side excursions, and what not—and in such case, when the vehicle leaves the route, the latch 8 is opened. And it is closed again only when the route is resumed. Even so, there will be cases of forgetfulness, and cases in which the route is resumed at a point other than that of departure, and provision for resetting to accord with the course of the route is necessary.

The counter-shaft 22 is organized to become the drive shaft of an odometer 5. The odometer may be understood to include (as is usual) a trip indicator, that is to say, an indicator of the mileage from the point of departure for a given run, of say five hundred miles, more or less; and this trip indicator portion of the odometer is provided with a thumb-wheel 48, by which it may be set—at zero, or at another desired point.

A timing shaft 9, mounted for rotation within the casing, is also journaled in bar 49, so that, like shaft 72, it is shifted longitudinally by the shifting of the bar. The shaft 9 carries bevel-gears 23a and 24a; and when the bar 49 on the opening of the latch 8 is shifted by the springs 18 (with disconnection of the line of transmission from the vehicle-moving parts to the phonograph), the correspondingly numbered gear wheels 23a upon the shaft 9 and 23b upon shaft 22, are brought into mesh. At the same time correspondingly numbered gear-wheels 24a upon shaft 9 and 24b upon an auxiliary shaft 17, are also brought into mesh. The shaft 17 carries a gear-wheel 25 that meshes with teeth formed on the nether face of gear rack 6.

Suppose, now, a case in which the driver of a sightseeing bus has left his route at the 250-mile point and in so doing has neglected to release the latch 8. He has traveled a greater or less distance and has returned to the point of departure. But now his phonograph is no longer in proper setting and will not, without correction, deliver a properly synchronized speech. The latch 8 then is opened, and by the thumb-wheel 48, the trip indicator is turned backward to the 250-mile mark.

Suppose again that a detour has been traversed, and return is made to a point on the route in advance of the point of departure. The operator will normally have opened the latch 8 when leaving the route. On return he may, by reference to a route guide, note the distance of the point of return from zero (the point of initial departure). He may then (the latch 8 continuing in release position) turn the odometer to the value indicated to him in the route guide. In both of these two cases he will shift the arcuate rack 6, through a corresponding range. Since the electric circuit is then open and the needle 15, retracted, the bridge arm 7 will then swing with the rack 6 and be brought to its proper position; so that, when the latch 8 is closed and operation is renewed, the needle will engage the disk again at the proper point and the phonograph will be adjusted again to the route.

The pinion engagement of the needle arm 7 with the rack 6 is such that when the needle is in engagement with the record disk the pinion 55 will advance upon the rack while the rack remains stationary, but when the rack is shifted (the needle then being retracted), the frictional engagement of the rack with the pinion will suffice to effect a corresponding clockwise swing of the arm 7.

Through a toggle switch 10, and the ignition switch 73 of the vehicle the operating electrical circuit from a source 74 is completed, as shown in the diagram, Fig. IX.

Operation may be briefly summarized. When a run of the vehicle over the established route is to be made, the appropriate record disk 1 is placed on the record platform, and the appropriate master disk 2 is applied and set at zero. The trip indicator of the odometer also is set at zero. And the bridge arm 7 is brought to zero position. The latch 8 is closed; and the toggle switch 10 is then also closed. The parts then are in the position shown in Fig. I. When the ignition switch 73 of the vehicle is closed the instrument is ready to operate.

The vehicle then starts and, as it advances, the disks 1 and 2 turn at a rate in accord with the speed of travel. When a speed of twenty miles an hour is attained electrical connection is completed through parts 40, 41 and, thereafter, with the intermittency imposed by the master disk 2, the phonograph speaks—giving description, perhaps, of points of interest as in the course of travel they are reached, or giving other pertinent advice.

Adaptation to circumstances of travel has already been explained.

Use upon a sight-seeing automotive bus is typical. Manifestly, the instrument of the invention may be usefully applied and adapted to any vehicle, traveling upon the ground, upon water, or in the air; and the speech of the phonograph may be, by way of entertainment, or instruction of passengers, or by way of advice to the operator of the vehicle, useful to him for one reason or another.

We claim as our invention:

1. Phonograph mechanism for installation in a vehicle, which comprises, in combination, a turntable adapted to receive a phonograph record, a needle arm adapted to swing over a record placed on the turntable, a pivotal mounting for an end of the needle arm positioned beyond, but adjacent to, the periphery of the turntable, a needle holder on the said arm, a needle in the needle holder, instantaneously operating mechanism for bringing the needle into engagement with the record and for predeterminedly instantanously releasing the needle from the said record, power transmission instrumentalities for effecting rotation of the turntable at a speed in accord with the speed of vehicle travel, a clutch in the said instrumentalities for predeterminedly rendering the turntable non-responsive to vehicle travel, when the clutch is open, control mechanism for effecting selected opening and closing of the clutch, means for horizontally swinging the needle arm about its pivotal mounting when the clutch is open, and a manually rotatable shaft carried by the clutch control mechanism adapted to actuate the said means for horizontally swinging the needle arm, the said means for horizontally swinging the needle arm being actuated through the clutch control mechanism to swing the needle arm when the clutch is open and the said means thereby being operatively connected with the manually rotatable shaft, the said means for horizontally swinging the needle arm being disconnected from the manually rotatable shaft incidently to actuation of the clutch control mechanism to close the clutch.

2. Phonograph mechanism for installation in a a vehicle, which comprises, in combination, a turntable adapted to receive a phonograph record, a needle arm adapted to swing over a record placed on the turntable, a pivotal mounting for the needle arm positioned beyond, but adjacent to, the periphery of the turntable, a needle holder mounted on the said needle arm, a needle in the holder adapted to be brought into, and out of, operative engagement with the record, the needle holder being movable in its mounting between positions of needle engagement with and out of engagement with the record, instantaneously operating mechanism for bringing the needle into engagement with the record and for predeterminedly releasing the needle from the said record, power transmission instrumentalities including means for effecting rotation of the turntable at a speed in accord with the speed of vehicle travel, and a clutch in the said power transmission instrumentalities for predeterminedly rendering the turntable non-responsive to vehicle travel, control mechanism for effecting selected opening and closing of the clutch, means for horizontally swinging the needle arm about its pivotal mounting when the clutch is open, the said means for swinging the needle arm including a double rack extending in, and movable longitudinally in, an arc-shaped course centered at the pivotal mounting for the needle arm, means effecting a toothed engagement between the needle arm and rack, and a manually rotatable shaft carried by the clutch control mechanism and connectible with the said rack for swinging the needle arm horizontally responsively to opening the clutch, the connection between the manually rotatable shaft and rack including a pinion engaging the said rack, the said rack becoming disconnected from the manually rotatable shaft responsively to actuation of the clutch control mechanism to close the clutch.

3. Phonograph mechanism for installation in motor driven vehicles, which comprises in combination, a turntable for carrying a phonograph record adapted to enable reproduction of articulate speech recorded thereon, a source of electric current, a master disc, mechanism for rotating the turntable and master disc at the same speed, a needle bridge-arm adapted to move over the record on the turntable, a pivotal mounting for the needle bridge-arm positioned beyond, but adjacent to, the periphery of the turntable, a needle carrier on the needle bridge-arm, a needle in the said needle carrier, a spring normally holding the needle out of contact with the record, a solenoid in circuit with the source of current for bringing the needle into engagement with the record responsively to closing a circuit through the master disc and source of current, means on the master disc for predeterminedly closing and interrupting the said circuit, and means for rotating the master disc and turntable in accordance with the speed of travel of the vehicle.

4. Phonograph mechanism for installation in motor driven vehicles, which comprises, in combination, a turntable for carrying a phonograph record adapted to enable reproduction of articulate speech recorded thereon, an electrically conductive master disc, a source of current, mechanism for rotating the turntable and master disc at the same speed, a needle bridge-arm adapted to move over the record on the turntable, a pivotal mounting for the needle bridge-arm positioned beyond, but adjacent to, the periphery of the turntable, a needle carrier on the needle bridge-arm, a needle in the said needle carrier, a spring normally holding the needle out of contact with the record, a solenoid coil in circuit with the source of current for bringing the needle into engagement with the record responsively to closing a circuit through the master disc and source of current, an electric contact engaging the master disc, a lead connecting the contact and solenoid, means on the master disc for predeterminedly and intermittently rendering the master disc non-conductive, thereby predeterminedly releasing the needle from the record, means for slowly rotating the master disc and turntable in accordance with the speed of travel of the vehicle, means for starting the rotation of the master disc and turntable incident to starting the vehicle, and means for rendering the recorded speech inarticulate until the vehicle has reached a predetermined speed and whenever another predetermined speed is exceeded.

5. Phonograph mechanism for installation in motor driven vehicles, which comprises in combination, a turntable, record-retaining means on the turntable adapted to hold a record placed on the turntable from accidental displacement, the said record being provided with complementary means for engaging the said retaining means for holding the record in place on the turntable, the said record having recorded thereon passages of speech to conform to points along a usual route of travel of the vehicle, a source of current, an electrically conductive master disc, mechanism for rotating the turntable and master disc at the same speed, a needle bridge-arm adapted to move over the record on the turntable, a pivotal mounting for the needle bridge-arm positioned beyond, but adjacent to, the periphery of the turntable, a needle holder on the needle bridge-arm, a needle in the said needle carrier, a spring normally holding the needle out of contact with the record, a solenoid coil in circuit with the source of current, the needle holder being the movable member of the solenoid, energizing of the solenoid coil bringing the needle into engagement with the record responsively to closing a circuit through the master disc and source of current, an electric contact engaging the master disc, a lead connecting the contact and solenoid coil, electrically non-conducting segments predeterminedly spaced around the master disc for engagement with the said electric contact, thereby releasing the needle from the record during passage of the contact over the non-conducting segments, the needle being applied instantaneously to the record responsively to the successive engagement of the contact with conductive portions of the master disc, means for slowly rotating the master disc and turntable in accordance with the speed of travel of the vehicle, instrumentalities for starting the rotation of the master disc and turntable incident to starting the vehicle, and mechanism for rendering the master disc and turntable inoperative upon departure of the vehicle from its usual route of travel.

6. Phonograph mechanism for installation in motor driven vehicles, which comprises, in combination, a turntable, record-retaining means on the turntable adapted to hold a phonograph record having recorded thereon passages of speech to conform to points along a usual route of travel of the vehicle, a source of current, an electrically conductive master disc, mechanism for rotating the turntable and master disc at the same speed, a needle bridge-arm adapted to move over the record on the turntable, a pivotal mounting for the needle bridge-arm positioned beyond, but adjacent to, the periphery of the turntable, a needle carrier on the needle bridge-arm, a needle in the said needle carrier, a spring normally holding the needle out of contact with the record, a solenoid coil in circuit with the source of current, the needle holder being the movable member of the solenoid, energizing of the solenoid coil instantaneously bringing the needle into engagement with the record responsively to closing a circuit through the master disc and source of current, an electric contact engaging the master disc, a lead connecting the said contact and solenoid coil, electrically non-conductive segments spaced around the master disc for engagement with the said contact, the segments corresponding to spaces between the recorded passages on the record, passage of the contact over the non-conductive segments releasing the needle from the record, the needle being instantaneously reapplied to the record upon engagement of the contact with conducting portions of the master disc, mechanism for slowly rotating the master disc and turntable during travel of the vehicle, instrumentalities for starting the rotation of the master disc and turntable incident to starting the vehicle, mechanism for rendering the master disc and turntable inoperative upon departure of the vehicle from its usual route of travel, and instrumentalities for setting the master disc and turntable with the record thereon to a passage on the record corresponding to desired points along the usual route after return of the vehicle thereto.

7. Phonograph mechanism for installation in motor driven vehicles, which comprises, in combination, a turntable for receiving a record, a record on the turntable having recorded thereon passages of articulate speech, a source of electric current, a master control disc, mechanism for rotating the turntable and master disc at the same speed, a needle bridge-arm adapted to move over the record on the turntable, a pivotal mounting for one end of the needle bridge-arm positioned beyond, but adjacent to, the periphery of the turntable, the said needle bridge-arm having its other end adapted to move in an arc having the pivotal mounting for its center, a holder for the needle secured to the bridge-arm intermediate the pivotal mounting and the said end of the bridge-arm, means for supporting the said end of the bridge-arm for rigidly carrying the said bridge-arm, the said supporting means including a movable double rack adapted also to swing the said needle bridge-arm over the record, the said double rack extending in, and movable longitudinally in, an arc-shaped course centered at the pivotal mounting of the needle bridge-arm, mechanism for thus moving the said rack, a pinion on the said end of the needle bridge-arm adapted to travel on the rack incident to movement thereof, a spring around the needle holder tending to lift the needle bridge-arm and needle away from the record, a solenoid coil enclosing the needle holder and positioned below the spring, the solenoid coil being in circuit with the source of current, the needle holder being the movable member of the solenoid, energizing the solenoid coil pulling the needle holder and bridge-arm against the spring until the needle operatively engages the record, responsively to closing a circuit through the master contact disc and source of current, an electric contact member engaging the master disc, a lead connecting the contact member and solenoid coil, and means on the master control disc for predeterminedly intermittently interrupting the circuit through the solenoid coil for releasing the needle from the record at selected intervals.

8. Phonograph mechanism for installation in motor driven vehicles, which comprises, in combination, a turntable for carrying a phonograph record adapted to enable reproduction of articulate speech recorded thereon, a source of electric current, a master disc, mechanism for rotating the turntable and master disc at the same speed, a needle bridge-arm adapted to move over the record on the turntable, a pivotal mounting for the needle bridge-arm, positioned beyond, but adjacent to the periphery of the turntable, a needle carrier on the needle bridge-arm, a needle in the said needle carrier, a spring normally holding the needle out of contact with the record, a solenoid in circuit with the source of current for bringing the needle into engagement with the needle responsively through the circuit of the master disc and source of current, means on the master disc for predeterminedly closing and interrupting the circuit, means for rotating the said master disc and turntable in accordance with the speed of travel of the vehicle, and means for rendering the speech on the record inarticulate upon the vehicle reaching a speed of travel in excess of a predetermined maximum.

WILLARD H. BUENTE.
HARVEY L. DUNKER.

REFERENCES CITED

The following references are of record in the file of this patent:

UNITED STATES PATENTS

| Number | Name | Date |
|---|---|---|
| 909,502 | Woodruff | Jan. 12, 1909 |
| 1,464,329 | Mosley | Aug. 7, 1923 |
| 1,666,503 | Niethamer | Apr. 17, 1928 |
| 1,810,062 | Taylor | June 16, 1931 |